(12) United States Patent
Rolf et al.

(10) Patent No.: US 10,989,545 B2
(45) Date of Patent: *Apr. 27, 2021

(54) METHOD, APPARATUS, AND COMPUTER PROGRAM PRODUCT FOR MAP DATA AGNOSTIC ROUTE FINGERPRINTS

(71) Applicant: HERE Global B.V., Eindhoven (NL)

(72) Inventors: Daniel Rolf, Berlin (DE); Raul Cajias, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 80 days.

This patent is subject to a terminal disclaimer.

(21) Appl. No.: 16/430,670

(22) Filed: Jun. 4, 2019

(65) Prior Publication Data
US 2020/0386556 A1    Dec. 10, 2020

(51) Int. Cl.
*G01C 21/32*   (2006.01)
*G01C 21/34*   (2006.01)
(Continued)

(52) U.S. Cl.
CPC ......... *G01C 21/32* (2013.01); *G01C 21/3415* (2013.01); *G01C 21/3461* (2013.01);
(Continued)

(58) Field of Classification Search
CPC .............. G01C 21/32; G01C 21/3415; G01C 21/3461; G01C 21/3679; G06F 16/29
(Continued)

(56) References Cited

U.S. PATENT DOCUMENTS 7,801,675 B2   9/2010   Currie et al.
9,082,077 B2   7/2015   Petersen et al.
(Continued)

FOREIGN PATENT DOCUMENTS

EP   3 109 594 A1   12/2016
EP   3 252 430 A1   12/2017

OTHER PUBLICATIONS

Office Action for U.S. Appl. No. 16/430,650 dated Mar. 2, 2020.
(Continued)

*Primary Examiner* — Gertrude Arthur Jeanglaude
(74) *Attorney, Agent, or Firm* — Alston & Bird LLP

(57) ABSTRACT

Provided herein is a method of generating and communicating map data agnostic routes between systems. Methods may include: providing an indication of a route request between an origin and one or more points-of-interest; identifying a starting road segment corresponding to the origin and a point-of-interest road segment corresponding to each of the points-of-interest; receiving intermediate points and corresponding intermediate segments for a route between the starting road segment and the point-of-interest road segments; generating at least one route between the starting road segment and a corresponding one of the point-of-interest road segments and including the one or more intermediate segments, where the route includes a plurality of route fragments; generating a fingerprint for each route fragment; receiving, in response to the route request, a server-provided fingerprint for each route fragment; and comparing the generated fingerprints for each route fragment with the server-provided fingerprints for each route fragment.

24 Claims, 4 Drawing Sheets

(51) Int. Cl.
*G01C 21/36* (2006.01)
*G06F 16/29* (2019.01)
(52) U.S. Cl.
CPC ......... *G01C 21/3679* (2013.01); *G06F 16/29* (2019.01); *G01C 21/3667* (2013.01)
(58) Field of Classification Search
USPC ........................................................ 701/533
See application file for complete search history.

(56) References Cited

U.S. PATENT DOCUMENTS

| | | | |
|---|---|---|---|
| 9,171,464 B2 | 10/2015 | Khetan et al. | |
| 9,239,246 B2 | 1/2016 | Jones | |
| 9,697,426 B2 | 7/2017 | Baselau et al. | |
| 9,933,269 B2 | 4/2018 | Maishberer et al. | |
| 10,119,831 B2 | 11/2018 | Moore et al. | |
| 10,317,222 B2* | 6/2019 | Maischberger | G01C 21/3446 |
| 2001/0047241 A1* | 11/2001 | Khavakh | G01C 21/34 701/410 |
| 2010/0070772 A1 | 3/2010 | Nakamura et al. | |
| 2011/0125398 A1 | 5/2011 | Bos | |
| 2012/0042046 A1 | 2/2012 | Petersen et al. | |
| 2012/0173606 A1 | 7/2012 | Becker | |
| 2013/0204527 A1* | 8/2013 | Schilling | G01C 21/34 701/533 |
| 2016/0370192 A1* | 12/2016 | Maischberger | G01C 21/3446 |
| 2017/0016730 A1 | 1/2017 | Gawrilow | |
| 2018/0216949 A1 | 8/2018 | Kluge | |
| 2018/0259356 A1 | 9/2018 | Rolf et al. | |

OTHER PUBLICATIONS

Office Action for U.S. Appl. No. 16/430,662 dated Mar. 2, 2020.
Jiang et al., *Design of a Multiple Bloom-Filter for Distributed Navigation Routing*, IEEE (2011) 8 pages.
Lu, M. et al., *Visual Analysis of Multiple Route Choices Based on General GPS Trajectories*, IEEE Transactions on Big Data (2017) 14 pages.
Notice of Allowance for U.S. Appl. No. 16/430,666 dated Aug. 12, 2020.
Office Action for U.S. Appl. No. 16/430,666 dated Apr. 28, 2020.
Notice of Allowance for U.S. Appl. No. 16/430,650 dated Jun. 17, 2020.
Notice of Allowance for U.S. Appl. No. 16/430,662 dated Jun. 16, 2020.
Extended European Search Report for Application No. 20177815.6 dated Oct. 14, 2020, 8 pages.

* cited by examiner

US 10,989,545 B2

METHOD, APPARATUS, AND COMPUTER PROGRAM PRODUCT FOR MAP DATA AGNOSTIC ROUTE FINGERPRINTS

TECHNOLOGICAL FIELD

Embodiments described herein generally relate to generating and communicating a route between an origin and a destination to a client from a server, and more particularly, to generating and communicating a map format agnostic route between an origin and a destination to allow route communication between different map formats or versions.

BACKGROUND

Historically paper-based maps were periodically updated in terms of months, years, or longer to account for changes to road infrastructure. Map updates required substantial manual effort and printing of new maps based on the anticipated need. Paper maps have given way to digital maps which can be updated considerably more regularly, and can be of substantially greater detail including all manner of features from roadways to points-of-interest or other features that can be geo-located.

Digital maps can benefit from various data sources such as satellite imagery, crowd-sourced location and image data, crowd-sourced feature/point-of-interest information, municipal databases, map service provider data including sensor-equipped vehicles traveling along road networks, etc. The vast volumes of map-related data can be compiled, filtered, and analyzed to establish map updates and changes. These updates and changes can be implemented with relative ease and can be updated periodically or on-demand based on the latest available data. However, the frequency with which map data may be updated can relegate some digital maps as obsolete or out-of-date relatively quickly. Further, older map versions may be incompatible with newer map versions, particularly when substantial changes exist between the map versions. This problem leads to issues in the exchange of data between one map version and another, such as location data, point-of-interest data, road infrastructure data, or the like.

BRIEF SUMMARY

A method, apparatus, and computer program product are provided in accordance with an example embodiment for generating and communicating a route between an origin and a destination to a client from a server, and more particularly, to generating and communicating a map format agnostic route between an origin and a destination to allow route communication between different map formats or versions. Embodiments provided herein may include an apparatus having at least one processor and at least one memory including computer program code. The at least one memory and computer program code configured to, with the processor, cause the apparatus to at least: provide an indication of a route request between an origin and one or more points-of-interest; identify a starting road segment corresponding to the origin; identify a point-of-interest road segment corresponding to each of the one or more points-of-interest; receive one or more intermediate points for a route between the starting road segment and each of the one or more point-of-interest road segments; identify one or more intermediate segments corresponding to the one or more intermediate points; generate at least one route between the starting road segment and a corresponding one of the one or more point-of-interest road segments and including the one or more intermediate segments, where the route includes a plurality of route fragments, each route fragment extending between a starting road segment and an intermediate road segment of the one or more intermediate road segments, between intermediate segments of the one or more intermediate segments, or between an intermediate segment and the respective point-of-interest road segment; generate a fingerprint for each route fragment of the at least one route; receive, in response to the route request, a server-provided fingerprint for each route fragment; compare the generated fingerprints for each route fragment with the server-provided fingerprints for each route fragment; and in response to the generated fingerprints for each route fragment corresponding with the server-provided fingerprints for each route fragment, provide navigational assistance for traveling along the route.

Causing the apparatus of example embodiments to generate a fingerprint for each route fragment may include causing the apparatus to, for each route fragment: retrieve map agnostic properties of road segments of the respective route fragment, where the map agnostic properties include one or more of road name, road number, travel direction, or functional class; combine the map agnostic properties into a string; hash the string of map agnostic properties using a hash function to obtain a hash value; and identify a leading predetermined number of characters of the hash value as the fingerprint. An example apparatus may further be caused to, in response to a first fingerprint of the fingerprints for each route fragment corresponding to a first route fragment failing to correspond with a first fingerprint of the server-provided fingerprints, provide an indication of a revised route fragment request between a starting point of the first route fragment and an ending point of the first route fragment. The revised route fragment request may include a prohibition of using a road segment of the first route fragment in a revised route.

According to some embodiments, an apparatus may be caused to, in response to a first fingerprint of the fingerprints for each route fragment failing to correspond with a first fingerprint of the server-provided fingerprints, provide a request for a map update. The request for the map update may include a request for a map update to a finite region of the map, where the finite region corresponds to a region including a road segment associated with the first fingerprint of the server-provided fingerprints. Causing the apparatus to generate at least one route may include causing the apparatus to: calculate a distance for each path that begins at the starting road segment and ends at a point-of-interest of the one or more points-of-interest; and identify the path to each point-of-interest including the shortest distance as the route to the respective point-of-interest. Causing the apparatus to generate at least one route may include causing the apparatus to: calculate a cost factor for each path that begins at the starting road segment and ends at a point-of-interest of the one or more points-of-interest; and identify the path to each point-of-interest including the lowest cost factor as the route to the respective point-of-interest.

Embodiments provided herein may include a computer program product having at least one non-transitory computer-readable storage medium having computer-executable program code portions stored therein. The computer-executable program code portions including program code instructions configured to: provide an indication of a route request between an origin and one or more points-of-interest; identify a starting road segment corresponding to the origin; identify a point-of-interest road segment corresponding to each of the one or more points-of-interest; receive one or more intermediate points for a route between the starting road segment and each of the one or more points-of-interest; identify one or more intermediate segments corresponding to the one or more intermediate points; generate at least one route between the starting road segment and a corresponding one of the one or more point-of-interest road segments and including the one or more intermediate segments, where the route includes a plurality of route fragments, each route fragment extending between a starting road segment and an intermediate segment of the one or more intermediate segments, between intermediate segments of the one or more intermediate segments; or between an intermediate segment of the one or more intermediate segments and the respective point-of-interest road segment; generate a fingerprint for each route fragment of the at least one route; receive, in response to the route request, a server-provided fingerprint for each route fragment; compare the generated fingerprints for each route fragment with the server-provided fingerprints for each route fragment; and in response to the generated fingerprints for each route fragment corresponding with the server-provided fingerprints for each route fragment, provide navigational assistance for traveling along the route.

The program code instructions to generate a fingerprint for each route fragment may include program code instructions to, for each route fragment: retrieve map agnostic properties of road segments of the respective route fragment, where the map agnostic properties include one or more of road name, road number, travel direction, or functional class; combine the map agnostic properties into a string; hash the string of map agnostic properties using a hash function to obtain a hash value; and identify a predetermined number of leading characters of the hash value as the fingerprint. Embodiments may include program code instructions to, in response to a first fingerprint of the fingerprints for each route fragment corresponding to a first route fragment failing to correspond with a first fingerprint of the server-provided fingerprints, provide an indication of a revised route fragment request between the starting point of the first route fragment and an ending point of the first route fragment. The revised route fragment request may include a prohibition of using a road segment of the first route fragment in a revised route.

According to some embodiments, the computer program product may further include program code instructions to, in response to a first fingerprint of the fingerprints for each route fragment failing to correspond with a first fingerprint of the server-provided fingerprints, provide a request for a map update. The request for a map update may include a request for a map update to a finite region of the map, where the finite region may correspond to a region including a road segment associated with the first fingerprint of the server-provided fingerprints. The program code instructions to generate at least one route may include program code instructions to: calculate a distance for each path that begins at the starting road segment and ends at a point-of-interest of the one or more points-of-interest; and identify the path to each point-of-interest including the shortest distance as the route to the respective point-of-interest. The program code instructions to generate at least one route may include program code instructions to: calculate a cost factor for each path that begins at the starting road segments and ends at a point-of-interest of the one or more points-of-interest.

Embodiments provided herein may include a method. The method may include: providing an indication of a route request between an origin and one or more points-of-interest; identifying a starting road segment corresponding to the origin; identifying a point-of-interest road segment corresponding to each of the one or more points-of-interest; receiving one or more intermediate points for a route between the starting road segment and each of the one or more point-of-interest road segments; identifying one or more intermediate segments corresponding to the one or more intermediate points; generating at least one route between the starting road segment and a corresponding one of the one or more point-of-interest road segments and including the one or more intermediate segments, where the route includes a plurality of route fragments, each route fragment extending between a starting road segment and an intermediate segment of the one or more intermediate segments; between intermediate segments of the one or more intermediate segments; or between an intermediate segment of the one or more intermediate segments and the respective point-of-interest segment; generating a fingerprint for each route fragment of the at least one route; receiving, in response to the route request, a server-provided fingerprint for each route fragment; comparing the generated fingerprints for each route fragment with the server-provided fingerprints for each route fragment; and in response to the generated fingerprints for each route fragment corresponding with the server-provided fingerprints for each route fragment, providing navigational assistance for traveling along the route.

Generating a fingerprint for each route fragment may include, for each route fragment: retrieving map agnostic properties of road segments of the respective route fragment, where the map agnostic properties include one or more of road name, road number, travel direction, or functional class; combining the map agnostic properties into a string; hashing the string of map agnostic properties using a hash function to obtain a hash value; and identifying a predetermined number of leading characters of the hash value as the fingerprint. In response to a first fingerprint of the fingerprints for each route fragment corresponding to a first route fragment filing to correspond with a first fingerprint of the server-provided fingerprints, providing an indication of a revised route fragment request between a starting point of the first route fragment and an ending point of the first route fragment. The revised route fragment request may include a prohibition of using a road segment of the first route fragment in a revised route.

Methods may include, in response to a first fingerprint of the fingerprints for each route fragment failing to correspond with a first fingerprint of the server-provided fingerprints, providing a request for a map update. The request for the map update may include a request for a map update to a finite region of the map, where the finite region may correspond to a region including a road segment associated with the first fingerprint of the server-provided fingerprints. Generating at least one route may include: calculating a distance for each path that begins at the starting road segment and ends at a point-of-interest of the one or more points-of-interest; and identifying the path to each point-of-interest may include the shortest distance as the route to the respective point-of-interest. Generating at least one route may include: calculating a cost factor for each path that begins at the starting road segment and ends at a point-of-interest of the one or more points-of-interest; and identifying the path to each point-of-interest having the lowest cost factor as the route to the respective point-of-interest.

Embodiments provided herein may include an apparatus. The apparatus may include: means for providing an indication of a route request between an origin and one or more points-of-interest; means for identifying a starting road segment corresponding to the origin; means for identifying a point-of-interest road segment corresponding to each of the one or more points-of-interest; means for receiving one or more intermediate points for a route between the starting road segment and each of the one or more point-of-interest road segments; means for identifying one or more intermediate segments corresponding to the one or more intermediate points; means for generating at least one route between the starting road segment and a corresponding one of the one or more point-of-interest road segments and including the one or more intermediate segments, where the route includes a plurality of route fragments, each route fragment extending between a starting road segment and an intermediate segment of the one or more intermediate segments, between intermediate segments of the one or more intermediate segments, or between an intermediate segment of the one or more intermediate segments and the respective point-of-interest segment; means for generating a fingerprint for each route fragment of the at least one route; means for receiving, in response to the route request, a server-provided fingerprint for each route fragment; comparing the generated fingerprints for each route fragment with the server-provided fingerprints for each route fragment; and in response to the generated fingerprints for each route fragment corresponding with the server-provided fingerprints for each route fragment, means for providing navigational assistance for traveling along the route.

The means for generating a fingerprint for each route fragment may include, for each route fragment: means for retrieving map agnostic properties of road segments of the respective route fragment, where the map agnostic properties include one or more of road name, road number, travel direction, or functional class; combining the map agnostic properties into a string; means for hashing the string of map agnostic properties using a hash function to obtain a hash value; and means for identifying a predetermined number of leading characters of the hash value as the fingerprint. In response to a first fingerprint of the fingerprints for each route fragment corresponding to a first route fragment filing to correspond with a first fingerprint of the server-provided fingerprints, the apparatus may include means for providing an indication of a revised route fragment request between a starting point of the first route fragment and an ending point of the first route fragment. The revised route fragment request may include a prohibition of using a road segment of the first route fragment in a revised route.

An example apparatus may include, in response to a first fingerprint of the fingerprints for each route fragment failing to correspond with a first fingerprint of the server-provided fingerprints, means for providing a request for a map update. The request for the map update may include a request for a map update to a finite region of the map, where the finite region may correspond to a region including a road segment associated with the first fingerprint of the server-provided fingerprints. The means for generating at least one route may include: means for calculating a distance for each path that begins at the starting road segment and ends at a point-of-interest of the one or more points-of-interest; and means for identifying the path to each point-of-interest may include the shortest distance as the route to the respective point-of-interest. The means for generating at least one route may include: means for calculating a cost factor for each path that begins at the starting road segment and ends at a point-of-interest of the one or more points-of-interest; and means for identifying the path to each point-of-interest having the lowest cost factor as the route to the respective point-of-interest.

BRIEF DESCRIPTION OF THE DRAWINGS

Figure 1:
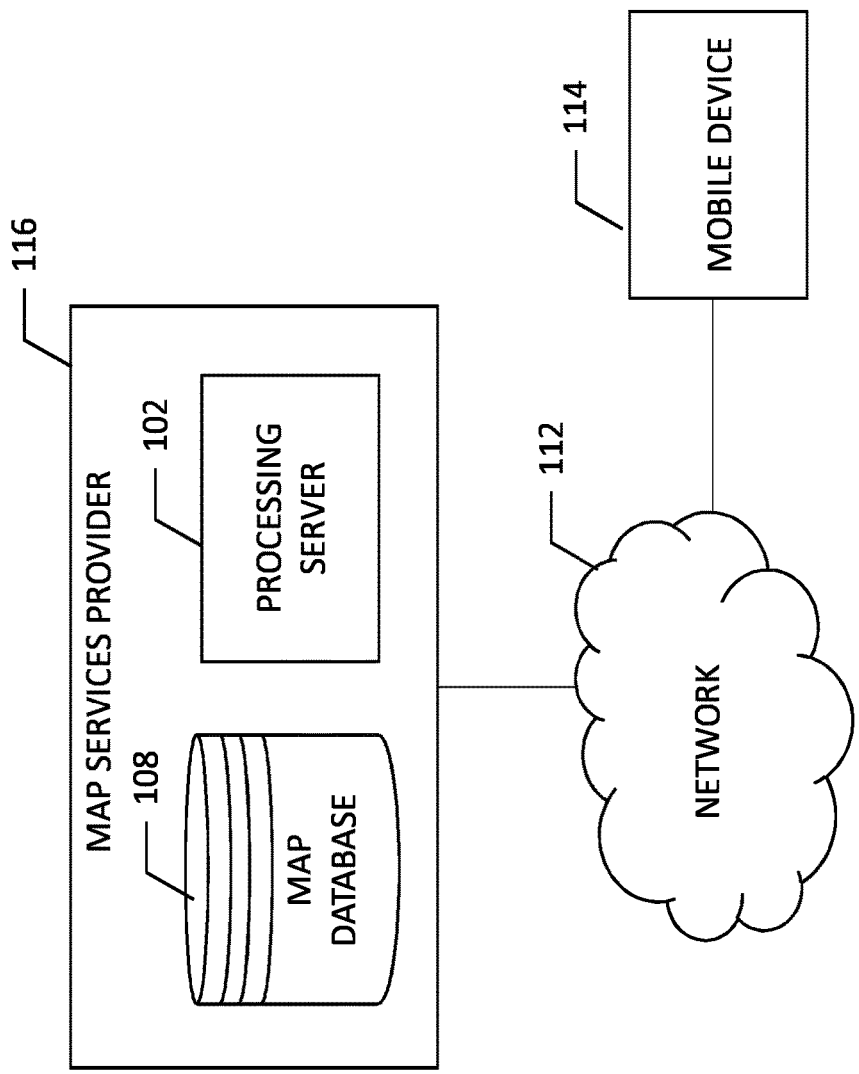
Figure 2:
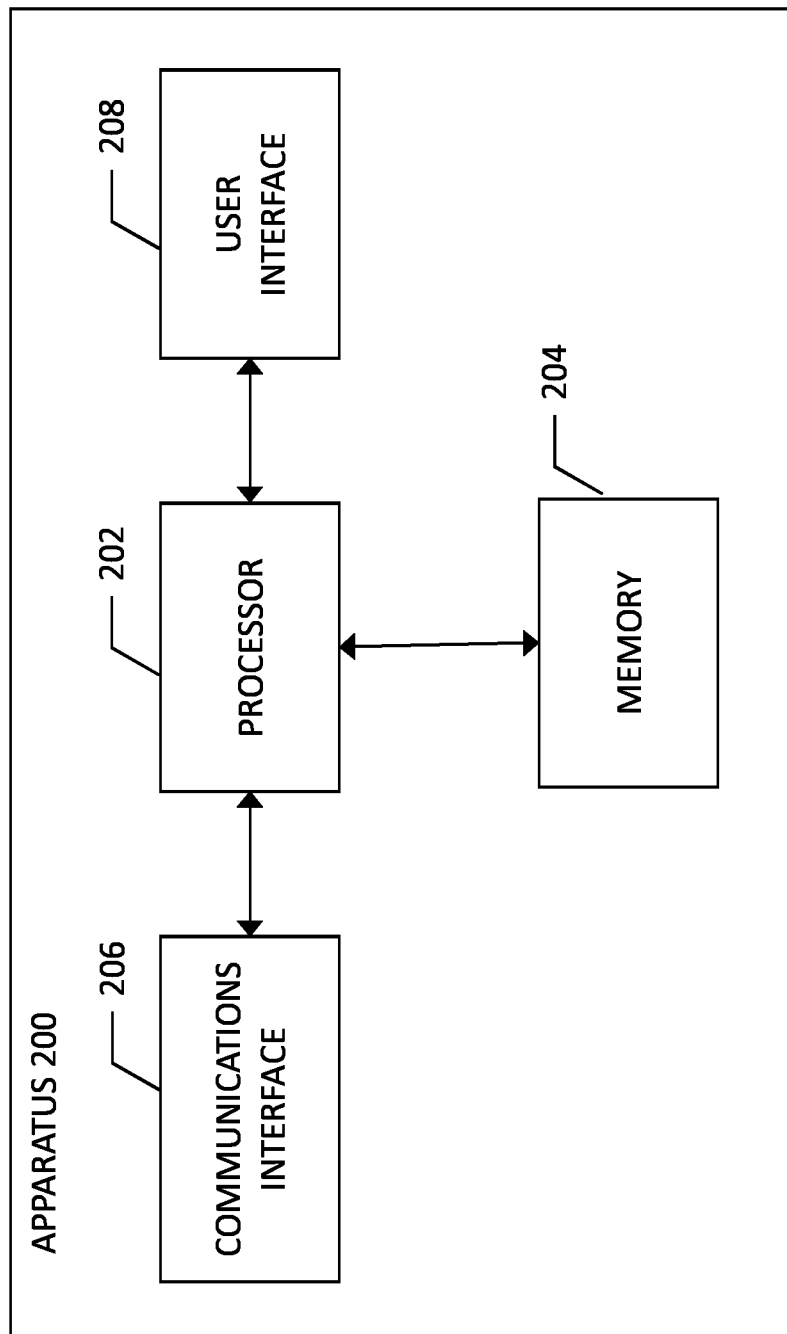
Figure 3:
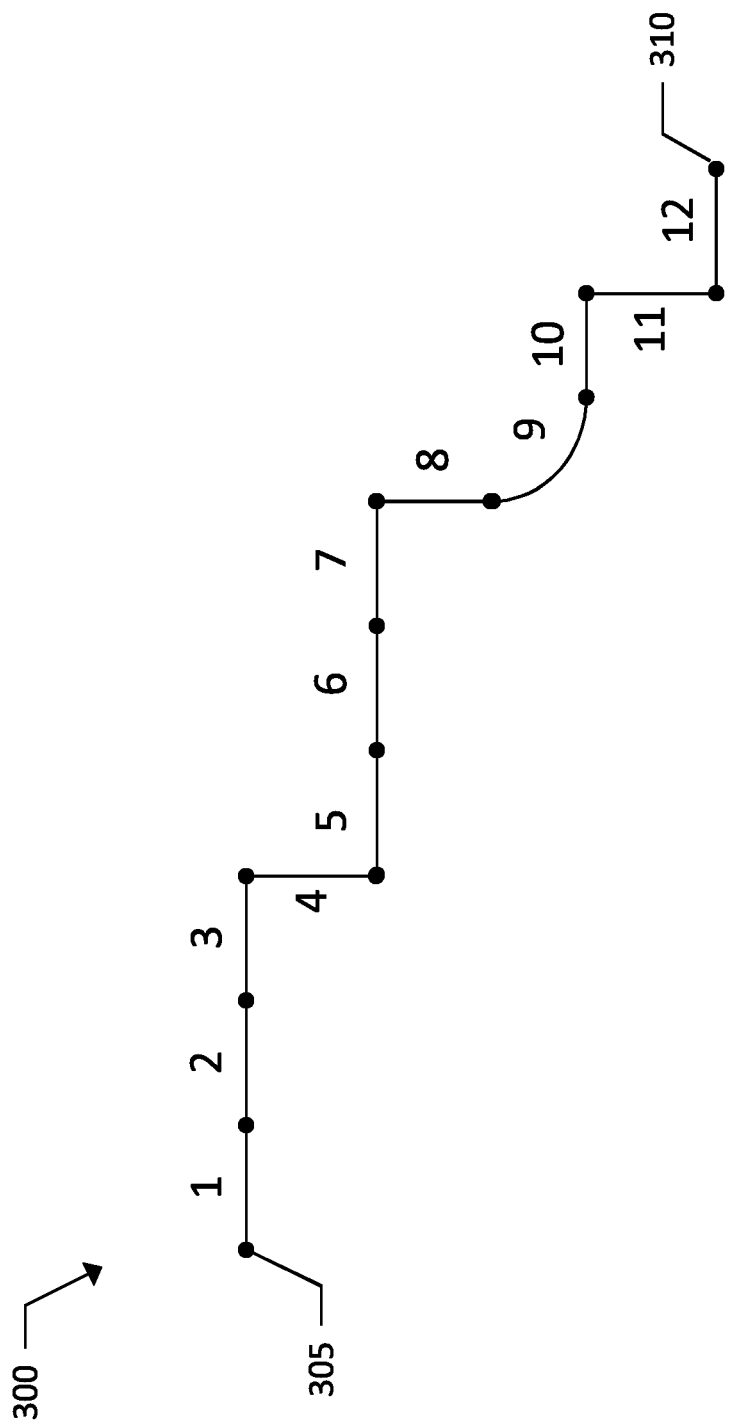
Figure 4:
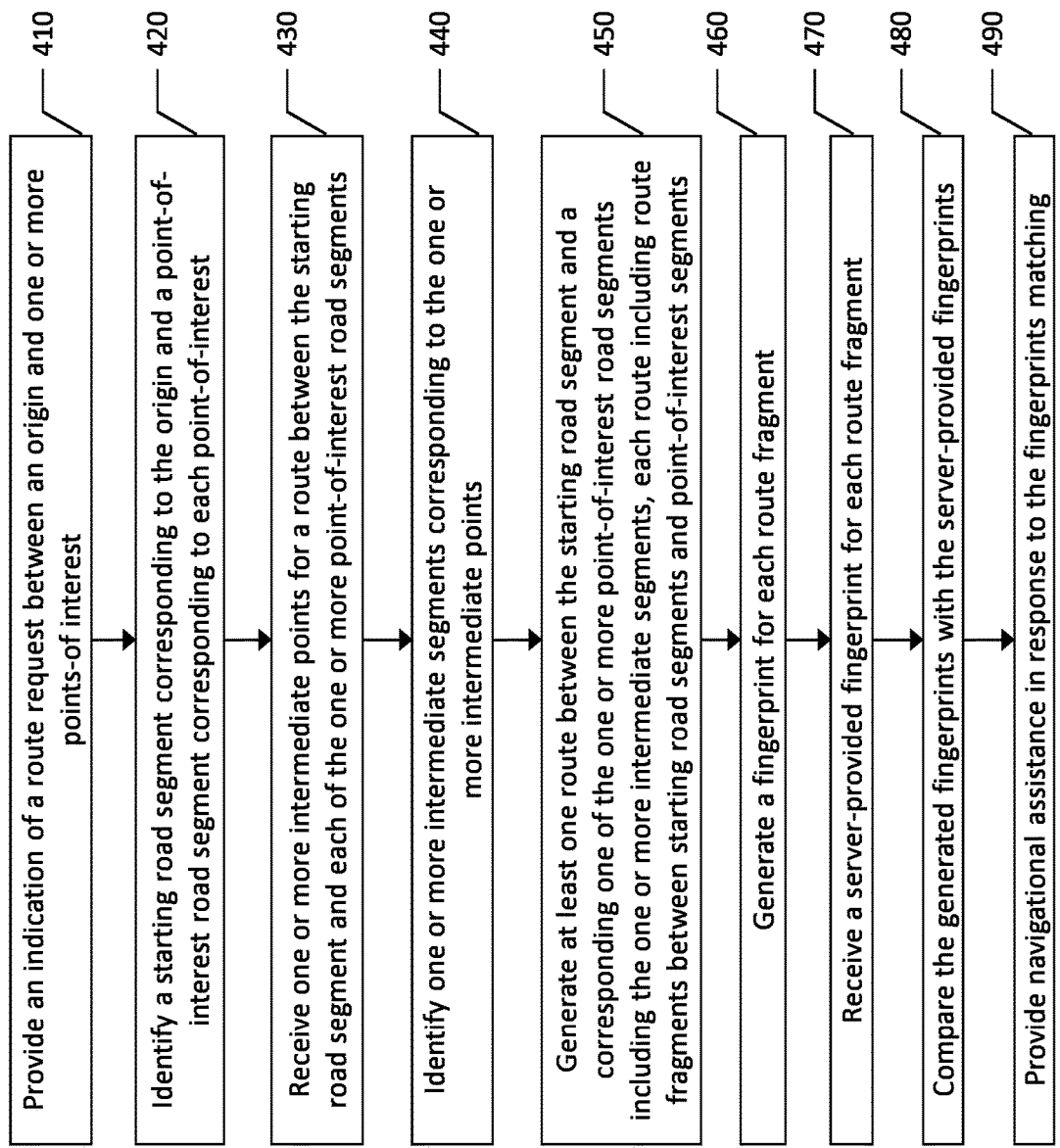

Having thus described example embodiments of the invention in general terms, reference will now be made to the accompanying drawings, which are not necessarily drawn to scale, and wherein:

FIG. 1 illustrates a communications diagram in accordance with an example embodiment of the present disclosure;

FIG. 2 is a block diagram of an apparatus that may be specifically configured for generating and communicating a map format agnostic route in accordance with an example embodiment of the present disclosure;

FIG. 3 illustrates a route divided into route segments according to an example embodiment of the present disclosure; and FIG. 4 is a flowchart of a method for generating a map format agnostic route between an origin and a destination according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus, and computer program product are provided herein in accordance with an example embodiment for generating and communicating navigational routes between an origin and a destination between systems which may have incompatible maps or map versions. Embodiments described herein are uniquely capable of identifying routes between an origin and a destination in a protocol that is road segment identification agnostic in the event that maps and map versions do not have compatible road segment identifiers or other incompatibilities that may otherwise inhibit conventional route communication. FIG. 1 illustrates a communication diagram of an example embodiment of a system for implementing example embodiments described herein. The illustrated embodiment of FIG. 1 includes a map services provider system 116, a processing server 102 in data communication a geographic map database, e.g., map database 108 through a network 112, and one or more mobile devices 114. The mobile device 114 may be associated, coupled, or otherwise integrated with a vehicle, such as an in-dash vehicle navigation unit, a vehicle head unit, an electronic control unit, or an advanced driver assistance system (ADAS), or a controller that facilitates autonomous or semi-autonomous driving, for example. Additional, different, or fewer components may be provided. For example, many mobile devices 114 may connect with the network 112. The map services provider 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

Processing server 102 may be one or more fixed or mobile computing devices. The mobile device 114 may be configured to access the map database 108 via the processing server 102 through, for example, a mapping application, such that the user equipment may provide navigational assistance to a user among other services provided through access to the map services provider 116.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The links or roadways may be represented by polylines, where each polyline comprises a plurality of vertices establishing the path of the roadway geometry. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map services provider, and may be periodically updated based on new roads, re-routing of existing roads, changes in points-of-interest, etc. By way of example, the map services provider can collect geographic data to generate and enhance the map database 108. According to some embodiments, the map database 108 may delegate map generation and revision to other devices, such as mobile device 114. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Also, remote sensing, such as aerial or satellite photography, can be used to generate map geometries directly or through machine learning as described herein. The map data gathered from among various sources may be compiled into map updates that may take place periodically or as needed, resulting in a dynamic map database 108 that is routinely changed and updated to reflect the most accurate representation of the roads and features of a region.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map services provider. For example, a customer of the map services provider, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example. Optionally, a portion of the map database 108, such as map data regarding a specific roadway, may be downloaded or stored temporarily on an end user device, and according to various embodiments described herein, the mobile device 114 may be configured to modify the map data regarding a roadway before sending the map data back to the map database 108.

According to some embodiments, a server side map database 108 and a client side map database may be different. For example, even when the map data of both map databases is from the same map services provider 116, the map data may differ from server side to client side. This may be due to different map versions existing and being updated at different periodic rates. Further, client map data and server map data may differ when the map data originates from different sources. Different map data and map versions between a client and a server may be problematic when routing services are required by the mobile device 114 and provided by the map services provider 116. Road segments that are identified by unique identifiers in a server side map database 108 may be incompatible with identifiers or road segments of a client side map database. As such, embodiments provided herein use an identifier-independent protocol to provide a server side generated route to a client.

In one embodiment, the mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. A mobile device is provided for navigation and map functions such as guidance and map display, for example, and for determination of one or more personalized routes or route segments based on one or more calculated and recorded routes, according to some example embodiments.

The processing server 102 may receive probe data from a mobile device 114 or a device in communication with mobile device 114. The mobile device 114 may include one or more detectors or sensors as a positioning system built or embedded into or within the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a processor of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal and longitudinal position, and/or height, GPS coordinates, wireless network positioning, such as Wi-Fi/Bluetooth™ positioning, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like. Probe data collected by a mobile device 114 may be error prone, where probe data location information may not correspond precisely with the actual physical location of the probe. For example, probes traveling through urban canyons, forests, or actual canyons may have probe data point locations that are very noisy in that they do not correspond well with the actual location of the probe due to signal noise and issues with locationing means for detecting the location of the probe.

An example embodiment of a processing server 102 may be embodied in an apparatus as illustrated in FIG. 2. The apparatus, such as that shown in FIG. 2, may be specifically configured in accordance with an example embodiment of the present invention for connecting server generated routes along road segments between an origin and a destination to client device map data, even when the server side map data differs from the client side map data. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example embodiments of the present invention may provide a mechanism for generating a route based on a server side map database, and communicating that route to a client in a manner compatible with client side map data. Map information, such as paths of roadways, direction of traffic on said roadways, intersections, and the like may be stored, for example, on a server-side map database 108. As roadway infrastructure is subject to deterioration over time, road construction on existing roadways is an inevitable event that will alter roadways at least temporarily. Further, increases in population and vehicular traffic result in the need for new or expanded roadways, while other roadways may be removed or replaced. The term "roadways," as used herein, may refer to any path a vehicle may take in moving from one place to another. Roadways may be paved, improved roadways, gravel roadways, dirt trails, or the like, such that roadways does not imply that the mapped roads are necessarily recognized as county, state, or federally maintained roads, and may include private roadways such as access roads, neighborhood streets, and the like. As these roadways may change over the course of time, map information related to these roadways may require revision to keep up with the changes to the roadway paths. Additional map update triggers may include changes associated with roadways such as speed limits changing on a road, which may also prompt segmentation of a road link resulting in new road links with new road link identifiers, for example.

The server side map database 108 may identify road segments by road segment identifiers used to uniquely identify road segments, where a sequence of identified road segments may be used as a route between an origin and a destination. However, client side map data may not be as up to date as server side map data. Client side map data may be map data that is provided with a navigation system or application, and may not receive the periodic updates afforded a server side map database 108. Consequently, the client map data may not match the server side map data, and the unique identifiers used to identify road segments in the server side map data may not correspond to unique identifiers of corresponding road segments in client map data. Further, roads may change through new construction, through the addition or demolition or roadways, through re-routing of roadways and traffic patterns, or the like. Thus, a route generated by a server side map service provider 116 may reference road segments through unique identifiers that do not correspond to an equivalent route on the client side map data.

Example embodiments described herein provide a mechanism to reliably and repeatably define a route and a workflow between a client and a server that is based on retracing the route on the client side between via-points and verifying fingerprints of the fragments. In order for a client side device to properly receive, interpret, and present route guidance along a route generated by a server side map services provider 116, the server and the client need to have the same map data and the same version of the map data such that a route that is computed on the server side may be transferred to the client and properly understood/translated. The unique identifiers of map road segments/links used to describe the chain of road segments in a route must match in the same map data and version for conventional route transfer between servers and clients.

If, for example, a map service provider maintains map support for four years, and releases a new map update/version every quarter, and has four different map format versions used in the field, the map service provider would need to keep four quarters (4) of four years (4) for four map formats (4) for a total of 64 map versions that would have to be simultaneously maintained on servers to anticipate that some device having any of the 64 variants may request a route from the map services provider. This approach does not scale for rapid refresh (e.g., weekly/daily releases) as illustrated due to the unsustainable growth of map variants that would need to be maintained. The more map variants needed results in greater memory consumption and lower processing performance. Embodiments described herein define a route and the workflow between a client and server that is based on retracing the route between via points of a route and verifying fingerprints of the fragments of the route, thereby avoiding the need to have identical versions of a map between a server and a client.

Networks of roads in a region may include a plurality of road segments or road links that join together to form the road network. Each of the road segments may include a reference point or "midpoint", which may be proximate the middle of a length of the road segment. Routes include a plurality of road segments in a sequence between an origin and a destination, while route fragments include groups of road segments along the route between intermediate road segments of the route. For example, a route may include road segments A, B, C, D, and E. With A being a starting road segment along which an origin is located, and E being a target road segment along which a destination is located. In an embodiment with a single intermediate road segment, road segment C would be the intermediate road segment spaced evenly between the starting road segment and the target road segment, even if the road segments are of unequal lengths. Road segments B and D would be route fragments between the start road segment and the intermediate road segment, and between the intermediate road segment and the target road segment.

According to example embodiments described herein, the server based map services provider 116 may use only a single variant of map data in the map database 108, thereby maintaining only a latest, most recent and accurate map. The client, such as mobile device 114 may be a pre-installed, potentially outdated map. For example, the mobile device may be embodied as a navigation system in a vehicle, where the map data on the mobile device may be installed at the time of vehicle assembly, and therefore may be stagnant and subject to becoming outdated. Using map-matching techniques, the mobile device 114 may identify a "START_SEGMENT" as the road segment in the outdated map on which the vehicle associated with the mobile device 114 is located. A "TARGET_SEGMENT" is a road segment identified by a user in the outdated map of the mobile device 114 as a destination to reach. This destination may be determined by geocoding of a target address, for example.

Server-Side Route Computation and Encoding

In order to generate a server-side route, specific data points of a road network may be defined, whether on the outdated map variant or a current version of a map. A midpoint of a road segment may be a coordinate of a point that is at or proximate the halfway point of the road segment. For example, a midpoint of a road segment that extends between two intersections or nodes and is a half-mile long may be a quarter mile from each intersection or node. An elevation may optionally be defined as a "z-level" of a road segment. The "z-level" or elevation of a road segment may typically be zero, though a road segment in a tunnel may have a negative z-level while stacked roads in bridges and interchanges may have a positive z-level. The z-level elevation describes the relative location of road segments in a vertical direction orthogonal to the ground. A hash function may be used by embodiments described herein. The hash function can be any ash function (e.g., MD5, SHA), though the same hash function will be used on both the server side and the client side of the route encoding and decoding processes.

The client (e.g., mobile device 114) may send a routing request to the server by encoding a start point. The start point may be encoded as the midpoint+z-level of the current road segment or "START_SEGMENT" of the mobile device 114. The destination may be encoded as the midpoint+z-level of the "TARGET_SEGMENT". The client may send a positive number "N" as the number of intermediate points desired to be received in the route and a positive number "M" as the number of fingerprint bits per fragment. The number of desired intermediate points and the number of fingerprint bits per fragment may be stored preferences of a user of a mobile device, whereby these inputs may not be required to be separately entered for each route request. Optionally, "N" may be established through learning, such as based on a length of a route or distance to a destination. In such an example, the number of available turns along a route may influence the size of "N" as with fewer available turns, the route may not need to be broken into too many fragments, while with many available turns, the route may need many fragments to be accurately constructed and correlated on a client side device as will be described further below. Similarly, "M" may be a learned value or a value established based on a length of a fragment. For very short fragments or longer fragments with few available turns, "M" may be shorter as fewer turns and road segments are likely to be included in the fragment, while long fragments and fragments with many available turns may require a higher value of "M" as will be understood through the disclosure below.

Based on the provided origin (START) and destination (TARGET), the server (e.g., map services provider 116) may find the appropriate segments in the latest map version. The server may process the input data with a tolerance, such as a few meters, by which an error of the midpoint provided by a client may differ from a corresponding midpoint identified by the server. Further, the z-level may be used for clarifying or "tie-breaking" the selected road segment in the event tunnels, bridges, or interchanges are located along the road segment identified by the midpoint.

If a map services provider cannot exactly match the START to its map, a warning will be flagged in a response to the client. In such a scenario, the user may be warned that they need to move locations (e.g., progress along a road segment or reach a new road segment) as the user is in an undefined location. Similarly, if a TARGET is not properly identified by the map services provider, a warning may be provided to a user that the TARGET is not reachable according to current map data and a revised TARGET destination should be selected.

Once a START and TARGET location are adequately identified by the server, a route may be generated using the latest map version. The route may be established based on a shortest route using a cost function for each road segment between the origin and the destination, with the goal of minimizing the cost function for the shortest route. While some embodiments may find the shortest route between an origin and a destination, embodiments may optionally identify the fastest route or route that takes the least amount of time. In computing the fastest route, the expected traffic speeds along each road segment considered for the route may be used based on real-time data and optionally incorporating historical traffic speed data. In this way the cost function may be used to establish the route with the lowest time cost between the origin and the destination while considering the influence of traffic along each route.

The server may pick "N" segments along the route, roughly equally distributed, and let them be denoted V_1 to V_N. If N is zero, no segment is chosen. The route is divided into N+1 route fragments R_0 to R_N. In such a scenario, the fragment R_0 is the route segment between and not including START_SEGMENT and V_1. The fragment R_1 is the route between and not including V_1 and V_2. This continues until the fragment R_N is the route between and not including V_N and TARGET SEGMENT. Notably, a fragment can be empty if two segments are adjacent.

The segments along the route may be selected based on dividing the total distance of the route by the number "N" to establish the distance between each of the N segments, "distanceV". Optionally, for each n[1, N−1], a distance may be calculated as n*distance along the route, and denoting the segment at that distance as route segment V_n. As road segments may be of differing lengths, the distance between the N segments may not be equal, and the spacing can be based on the approximate distance between N segments and selecting the most appropriate segment as V_N. The total number of links along the route may be counted, and the total number of links divided by N (number-of-links/N). Each selected link may be n*(number-of-links/N) in the sequence of route links V_n.

For each of the "N" intermediate points, a corresponding intermediate road segment identified V_n. The intermediate road segments may be a subset of the total number of road segments between an origin and a destination. The number of intermediate points is less than the total number of road segments between the origin and the destination as having the number of intermediate points being equal to the total number of road segments does not achieve the benefits of the present disclosure, As such, V_1 to V_N is always a smaller subset than the full set of route links between the origin and the destination.

FIG. 3 illustrates an example embodiment according to the present disclosure of a sequence of road segments forming a route. According to the illustrated embodiment, a START_SEGMENT=1 from origin 305, while a TARGET_SEGMENT=12 to a destination 310, the route including segments 1, 2, 3, 4, 5, 6, 7, 8, 9, 10, 11, and 12. Letting N=2, for two intermediate segments along the route, V_1=5, and V_2=9. This results in route fragments of R_0=(2, 3, 4); R_1=(6, 7, 8); and R_2=(10, 11).

For each fragment, R_0 . . . R_N, a fingerprint F_0 . . . F_N can be calculated. The fingerprint may be calculated by retrieving map agnostic properties of the segments of R_i to build a map-agnostic identification of each segment. Such properties include, for example, a road name, a travel direction, and a functional class. These map-agnostic identifiers can be combined to a string and hashed using the HASH function. The fingerprint F_i is taken as the first M bits of the hash value. This produces a fingerprints of the fragments, which can be combined to become a map-agnostic fingerprint of the route. The server may send to the client an encoded version of the route including the midpoint and z-level of V_1 . . . V_N and fingerprints F_1 . . . F_N. By sending the midpoint and z-level of the segments of the route, the approximate locations of the road segments can be identified within a predetermined level of confidence. The fingerprints F_1 . . . F_N positively identify the road segments through the hashed identifiers, thereby confirming the segments along the route. In this manner, road segments of a route do not have to identically match between the server map data and the client map data. This allows the map service provider 116 to generate routes using the most recent map version and having those routes properly interpreted by a client to reflect the route on the outdated map of the client, regardless of map version used by the client.

Embodiments described herein reduce conflicts between map versions whereby routes generated in a first version of a map cannot be properly correlated to routes in a second version of a map, thereby resulting in routing errors or the inability to generate a route. Further, by only sending intermediate points from the server to the client, bandwidth may be minimized while providing the client sufficient information to verify the fragments between intermediate points. Previous mechanisms for performing a similar task search for a matching link using a midpoint that involves a spatial, map-matching search for all links of a route which is computationally intensive. Using example embodiments described herein of route fragment fingerprints substantially reduces the bandwidth and processing requirements of the prior methods.

While the above-described embodiment finds a route between an origin and a destination, generating a fingerprint thereof, embodiments described herein may be used in routes of higher complexity. For example, routes may include waypoints that must be included along a route. In such an embodiment, in addition to a START and TARGET corresponding to an origin and a destination, one or more STOP locations could be received from a client. These waypoints may be designated as "STOP_i" with "i" denoting the number of the stop in the sequence of the route. According to the embodiment including waypoints, the START, TARGET, and all STOP_i could be encoded as the midpoint and the z-level of the START_SEGMENT, TARGET_SEGMENT, and all STOP_SEGMENT_i.

The example embodiment incorporating waypoints is similar to the embodiment described above lacking waypoints in that the map services provider 116 may compute a route that encompasses the waypoints. In this manner, the map services provider 116 may establish a route between START and every waypoint STOP_i, denoted as ROUTE_S_i. Routes may also be established between every STOP_i and TARGET, denoted as ROUTE_i_T. Finally, a route may be established between every STOP_i and STOP_j (where i does not equal j), denoted as ROUTE_i_j. This produces a plurality of routes between each point identified by the client.

The map services provider 116 or other routing server may then compute an optimal sequence SEQ of the intermediate stops or waypoints so that the overall travel distance or overall travel time from the START to the first stop in the sequence SEQ, between stops in the sequence SEQ, and from the last stop in sequence SEQ to TARGET is minimal. The computed ROUTEs are then used.

The route may be established between each pair of points (START, TARGET, and STOP_i) may be based on a shortest route using a cost function for each road segment between the origin and the destination, with the goal of minimizing the cost function for the shortest route. While some embodiments may find the shortest route between each pair of points, embodiments may optionally identify the fastest route or route that takes the least amount of time between points. In computing the fastest route, the expected traffic speeds along each road segment considered for the route may be used based on real-time data and optionally incorporating historical traffic speed data. In this way the cost function may be used to establish the route with the lowest time cost between points while considering the influence of traffic along each route.

The computed sequence SEQ, whether using shortest distance, shortest time, avoiding highways, or any other parameters used to generate the sequence, may be used to reorder the STOP_i waypoints so that STOP_i is the i-th stop in the sequence. This results in a sequence of routes that reaches each required waypoint or "tour". The tour may include the routes enumerated as ROUTE_S_1, ROUTE_S_2, . . . , ROUTE_K_T to form the optimal tour. The sequence SEQ may be provided in the routing response to a client so the client understands the order of intermediate waypoints in the tour based on the client's selection of the waypoints.

For each route ROUTE_S_1, ROUTE_S_2, . . . , ROUTE_K_T, a fingerprint may be generated. To do so, "N" road segments along the route are established that are approximately equally distributed, and each segment is denoted as V_1 to V_N. If N were to equal zero, such as if the routes were very short (e.g., several city blocks or less), no segment may be chosen. The route is divided into N+1 route fragments denoted R_0 to R_N, where fragment R_0 is the route between and not including START_SEGMENT and V_1, the fragment R_1 is the route between and not including V_1 and V_2, up to the fragment R_N as the route between and not including V_N and TARGET_SEGMENT. A fragment may be empty if two road segments (e.g., V_i and V_j) are adjacent.

An example embodiment of establishing the fragments is the same as described above with respect to FIG. 3. However, each route is a portion of the total tour, where a route is between two respective points of the tour including START, TARGET and STOP_i. As such, a fingerprint is generated for each route between points of the tour, in the same manner as described above with respect to the example of FIG. 3. The fingerprints for each route of the tour may be sent to the client in response to the client providing the origin, destination, and waypoints. The client can then reconstruct the shortest/fastest routes to reach each waypoint along their tour efficiently whereby the payload sent to the client is minimal, thereby minimizing bandwidth while conveying all necessary information to the client in a map version agnostic manner.

The aforementioned example embodiments of the present disclosure describe definitive destinations and waypoints that are to be included in a route or tour route. However, according to some examples described herein, embodiments may include providing routes to potential destinations that are not yet established as definitive destinations. For example, a user may search on a client device for points-of-interest, such as restaurants, within a region. The results of the search may identify a number of potential destinations. While the user may have certain preferences regarding the search results, it may be desirable for the user to recognize the route and travel time to reach the various points-of-interest to help the user make a fully informed decision.

According to an example described herein, a user may conduct a search for a category of points-of-interest. A plurality of search results may be returned. The results may be limited in a number of ways. The search may be confined to a certain distance from the user, the search may be confined based on search parameters, and optionally, the search may be limited by a maximum number of results. This maximum number of results "K" may be established based on a number above which a map becomes crowded or a number above which a user is overwhelmed with options. Regardless, the number "K" may be the maximum number of results returned to a user. As with the embodiments above, the number "N" may be the number of intermediate points while the number "M" may be the number of fingerprint bits per fragment.

The map services provider 116 of example embodiments may use the provided origin or START to find the appropriate segment on the latest version of the map. The map services provider may tolerate error of a few meters in map matching the START to a midpoint of a road segment for the START_SEGMENT and use the z-level to break ties among roads that may pass over or under one another. If the map services provider cannot match the START to a START_SEGMENT, a warning may be generated for a user that the user's present location does not correspond to a road segment of the latest version of the map, encouraging the user to move to a location that may be used for proper map matching to a START_SEGMENT.

Using the results of the search limited to "K" results, the map services provider 116 or another server may run an algorithm to find the shortest path to the search results. For example, the server may run Dijkstra's Algorithm starting at START_SEGMENT with modifications based on the present disclosure. Whenever the selected algorithm expands a segment S, the segment may be checked for points-of-interest of the respective category. If one or more of the points-of-interest of the requested category are found at segment S, the midpoint and z-level of the segment S may be stored as POI_i. The shortest path ROUTE_i from START_SEGMENT to that point-of-interest may be extracted from the Dijkstra's state. Once K points-of-interest are found, the algorithm may stop. While the Dijkstra Algorithm is described, any similar algorithm that yields K shortest path to K closest points-of-interest can be used. A benefit of using the modified Dijkstra algorithm is that it does not return the N bee-line-closest (e.g., as the crow flies shortest distance) point-of-interest, but the K travel-time-closest points-of-interest.

For every ROUTE_i to every POI_i, N segments along the route, roughly equally distributed, are picked, and denoted V_1 to V_N. If N is zero, no segment is chosen. The route is then divided into N+1 route fragments, R_0 to R_N. The fragment R_0 is the route between and not including START_SEGMENT and V_1. The fragment R_1 is the route between and not including V_1 and V_2. This continues until the fragment R_N is the route between and not including V_N and TARGET_SEGMENT, where the TARGET_SEGMENT is the road segment on which a point-of-interest POI_i for the route lies.

For each route ROUTE_i to each point-of-interest POI_i, fingerprints are generated for each route fragment. For each fragment R_0 to R_N a corresponding fingerprint F_0 to F_N is generated. The fingerprint may be calculated by retrieving map agnostic properties of the segments of R_i to build a map-agnostic identification of each segment. Such properties include, for example, a road name, a travel direction, and a functional class. These map-agnostic identifiers can be combined to a string and hashed using the HASH function. The fingerprint F_i is taken as the first M bits of the hash value. This produces a fingerprints of the fragments, which can be combined to become a map-agnostic fingerprint of the route. The server may send to the client an encoded version of the route including the midpoint and z-level of V_1 . . . V_N and fingerprints F_1 . . . F_N. By sending the midpoint and z-level of the segments of the route, the approximate locations of the road segments can be identified within a predetermined level of confidence. The fingerprints F_1 . . . F_N positively identify the road segments through the hashed identifiers, thereby confirming the segments along the route. In this manner, road segments of a route do not have to identically match between the server map data and the client map data. This allows the map service provider 116 to generate routes using the most recent map version and having those routes properly interpreted by a client to reflect the route on the outdated map of the client, regardless of map version used by the client.

The response to a client in a route request for a plurality of points-of-interest may include the midpoint and z-level of each point-of-interest POLL The midpoint and z-level of each intermediate segment V_1 . . . V_N of the processed route ROUTE_i for POLL The fingerprints F_1 . . . F_N for each fragment of the route are sent to the client of the processed ROUTE_i. The client can then use the transmitted information to easily reconstruct the travel path to each of K points-of-interest.

While the Dijkstra Algorithm is described to generate a shortest path between the START_SEGMENT and each point-of-interest POI_i, embodiments may use a variety of considerations for establishing the "best" path to each point-of-interest. For example, the map service provider 116 may consider traffic and the speed along road segments in establishing a cost of each segment when determining a route, so as to establish a shortest-time route. Further, routes may be generated to avoid highways if so selected by a user. Regardless of the factors influencing which route is chosen, the fingerprint generation of the route fragments and providing these fingerprints to the client remains the same.

Client-Side Route Computation and Decoding/Verification

As described above, a server such as a map services provider 116 may generate routes and fingerprints of the routes that are map-version agnostic for sending to a client. Encoding routes as fingerprints for clients to decode and interpret allows routes to be generated in a map version agnostic manner while conveying the critical information to the client.

The client of example embodiments, which may be embodied as a mobile device 114 (e.g., cellular phone, tablet computer, navigation device, or the like) or as an in-vehicle navigational system may be in communication, via network 112, with a server such as map services provider 116 and processing server 102 thereof. The server encodes fingerprinted route fragments to provide to the client. The client may make one or more roundtrips to the server in order to reconstruct routes provided by the server. The routes may be any of the aforementioned routes, including routes between an origin and a destination, routes between an origin and a destination with one or more waypoints, or routes between an origin and a plurality of destinations (e.g., points-of-interest). The maps on the server and the client potentially differ, such that mismatching can occur. If the client detects that a map difference is so severe that it cannot safely reconstruct a route (e.g., through decoding of the fingerprints of route fragments from the server), the client can either request a map update or refuse the route and request a different route.

According to an example embodiment, a client may send a route request between an origin and a destination to a server. The client may receive, in response, a plurality midpoints and a plurality of route fingerprints, each fingerprint corresponding to route fragments between the origin and a midpoint, between midpoints, and between a midpoint and the destination. The client may generate a plurality of route fragments between the origin and a midpoint, between midpoints, and between a midpoint and the destination, and determine route fragment fingerprints from the client generated route fragments. The client may compare the fingerprints of the generated route fragments with the route fingerprints provided by the server. If the a generated fingerprint fails to correspond to a fingerprint provided by the server, the client may request that the server re-compute the route fragment associated with the server provided fingerprint that fails to correspond to a client generated fingerprint.

In requesting that the server re-compute the route fragment, the client may provide the server with "unmatchable segments" that the client could not match to road segments in the client-side map. These unmatchable segments may be road segments associated with midpoints or "intermediate segments" provided to the server using their midpoints and z-levels, requesting that the server avoid these road segments of the latest version of the map maintained at the server. These become "banned segments" for the route generation. This process may be performed more than once, where the client may identify unmatchable segments that it requests the server to ban on subsequent routes generated. Unmatchable segments may be relatively uncommon, such that this process may not be frequently implemented. Map changes are generally somewhat trivial and only a very small amount of road updates will break connectivity, such as when a bridge is demolished or new, when highway interchanges change patterns, or when new roads are built. Further, the likelihood of unmatchable segments being present in two sequential routes is considerably less likely and should not generally interfere with user satisfaction.

When a client receives a route represented by a plurality of route fingerprints and intermediate road segments that correspond to route fingerprints generated by the client between the map-matched intermediate road segments, the client can present the route or routes and begin navigation to the destination, point-of-interest, or waypoint. The server of example embodiments may provide the client with one or more routes that optimizes efficiency in distance or time, or according to other client-defined preferences. The server may provide one route when the client requests a route between an origin and a destination, a sequence of routes when the client requests one or more waypoints, where the sequence of routes is between an origin and a first waypoint, between the waypoints, and between the final waypoint and the destination. The server may optionally provide a plurality of routes, such as when a search is conducted for a plurality of points-of-interest, and a route is generated from the origin to each of the different points-of-interest POLL The server may provide a route in the form of route fragment fingerprints and intermediate segments. For example, with a single route between an origin and a destination, where N=1 such that there are two route fragments generated, the server may provide the client with one intermediate point P_0 as the midpoint and z-level of the intermediate segment V_0, and fingerprints F_0 and F_1. The client may then interpret and decode P_0 to identify the corresponding intermediate segment V_0. In the event a corresponding segment is not found, the client may ask the user to update the map at location P_0 as the map in this area does not correspond to the latest map version on the server, and the route reconstruction may be tried again. If the user does not want to update the map, the client may try again and send P_0 as a banned segment to the server to retrieve a different route.

The client may compute a path R_0 between the START_SEGMENT and V_0 and R_1 between V_1 and the TARGET_SEGMENT to generate first and second route fragments. The client may then use the same fingerprinting technique described above to encode the route fragments of the route established. The computed path may be based on the shortest time or shortest distance, for example. The client, in requesting a route, may identify a preference for shortest time or shortest distance, among other preferences, such that when establishing a route for client encoding to one or more fingerprints, the client may use the same preferences to most closely mimic that which was performed at the server. From the established path, the client may compute fingerprints $G\_0$ and $G\_1$ for path or route fragments $R\_0$ and $R\_1$, respectively. If $F\_0$ from the server equates to $G\_0$, and $F\_1$ equates to $G\_1$, the client route fragments must equal the server side fragments. The algorithm may then stop based on the success of the matching and the final route is established: START_SEGMENT, $R\_0$, $V\_1$, $R\_1$, TARGET_SEGMENT.

In the event that $G\_0$ differs from $F\_0$, the route fragment $R\_0$ of the client differs from the route fragment $R\_0$ established by the server. The client then recursively executes the algorithm, but with TARGET_SEGMENT=$V\_0$ such that the client reduces the problem from the entire route to just the first route fragment $R\_0$ of the server. If $F\_1$ differs from $G\_1$, the route fragment $R\_1$ of the server differs from the corresponding fragment at the client. The client then recursively executes the route generation algorithm, but with START_SEGMENT=$V\_0$ to reduce the problem from the entire route to only the second route fragment. In this manner, route fragments for which fingerprints correspond between the server and the client can be established as matched and recursive route calculation is unnecessary. This reduces the route calculation to only route fragments that fail to correspond between the client and the server based on the fingerprint correlation.

Using the aforementioned technique, the client recursively attempts to match a generated route to a server generated route based on route fingerprints established for route fragments between the origin road segment, destination road segment, and any intermediate road segments. In doing this, the maps can be of different versions since the client attempts to match client-generated route fragment fingerprints to server-generated route fragment fingerprints, where the fingerprints are map version agnostic, such that the map versions need not match identically.

The result of embodiments described herein is a valid route in the client as the rules in the algorithm only traverse legal maneuvers. The algorithm minimizes client-server communication and thus bandwidth by only asking for details on pieces where fingerprints do not match. The algorithm of example embodiments discovers regions that require map updates and can provide a fallback if the user does not want to update the map, or if they are in a region of poor signal reception whereby map updates are not practical.

The client-side decoding of routes may be substantially the same whether the client is decoding a single route from an origin to a destination, a plurality of routes between an origin and each of a plurality of points-of-interest, or if the route is a sequence of routes between waypoints.

In an example embodiment in which the route request from the client includes a plurality of waypoints, the client sends a routing request to the server by encoding an origin (START), destination (TARGET), and all waypoints (STOP_i). These road segments are encoded using the midpoint and z-level of the START_SEGMENT, TARGET_SEGMENT, and each STOP_SEGMENT_i. The client also sends a value of N as the number of intermediate points desired and a value for M as the number of fingerprint bits per fragment. The server may then respond with the optimal tour plan so that the overall travel distance is minimal or the overall travel time is minimal based on an analysis of travel speeds along the road segments. The optimal tour includes a plurality of route legs ROUTE_i from the origin to the first waypoint, between waypoints in the event that there are multiple waypoints, and between the last waypoint and the destination. For each route leg, ROUTE_i, the server may send one or more intermediate points, established by the value of N. In an example embodiment in which the value of N is 1, the server would send one intermediate point $P\_i0$ as the midpoint plus the z-level and two fingerprints $F\_i0$ and $F\_i1$, where the fingerprints are for the route fragments on either side of the mid point. The two fingerprints include fingerprints of a route fragment from START to $P\_i0$ and from $P\_i0$ to POI_i or the waypoint of the route leg. The server may send a timestamp "T" of the route computation.

For each leg of the tour, the client may reconstruct the path ROUTE_i from the corresponding intermediate point ($P\_i0$) and the fingerprints ($F\_i0$ and $F\_i1$). The START_SEGMENT denotes the first segment of the first leg of the tour, and the TARGET_SEGMENT denotes the end segment of the first leg of the tour, where the TARGET_SEGMENT for a leg of the tour ends at a point of interest or waypoint. The client may use intermediate point $P\_i0$ to find the corresponding road segment $V\_i0$. If a corresponding segment is not found, the client may ask the user to update the map at location $P\_i0$, as the client understands that at least that portion of the map requires updating. In this manner, targeted updating of the client map may occur without requiring updates on a larger scale to the map. Such incremental updating may save bandwidth and minimize the volume of map data that is required to be communicated between a map data service provider and a client. Such incremental updating may be particularly beneficial as many clients will travel only within a limited region or range, such that map updates outside of that region may not be relevant to the client and thus may be superfluous. The incremental map update may be, for example, one or two square kilometers, or within a kilometer radius of the map location $P\_i0$. Optionally, a larger map update may be considered if certain requirements are met, such as the network connection speed of the user, the age of the map being used by a user, the number of segments that have been banned by a user or within a particular region by the user, etc.

The client may request that the map at location $P\_i0$ be updated if the intermediate point $P\_i0$ cannot be located on the client side map, and the client may attempt to recreate the route for the first leg of the tour after the update. However, a user may not want to update the map and the client may instead send the intermediate point $P\_i0$ to the server as a banned point corresponding to a banned segment, not to be used in a route provided by the server to the client. The server may then generate a different route for the first leg of the tour avoiding the banned segment.

According to some embodiments, the timestamp T may be used to establish historical traffic patterns at similar times/epochs to anticipate traffic levels along road segments estimated at the time of arrival at those segments along the route. The client may compute the fastest path $R\_i0$ between the START_SEGMENT and $V\_i0$, and $R\_i1$ between $V\_i1$ and TARGET_SEGMENT when N=1 as described above with only a singular intermediate point. The client may use the same fingerprinting procedure that is used on the server-side encoding to generate fingerprints $G\_i0$ and $G\_i1$ for $R\_i0$ and $R\_i1$, respectively. If $F\_i0=G\_i0$ and $F\_i1=G\_i1$, then the fingerprints generated at the client match the fingerprints generated by the server, and the client route fragments must equal the server-side route fragments. The algorithm has successfully established the route on the client and the final route is set: START_SEGMENT, R_i0, V_i0, R_i1, TARGET_SEGMENT.

If, on the other hand, F_i0 differs from G_i0, the route fragment R_i0 differs between the client and the server. The client may then request a routing server to compute the fastest traffic-aware route at timestamp T from START_SEGMENT and set TARGET_SEGMENT equal to V_i0, replacing the client-generated segment with the fastest traffic-aware route. If F_i1 differs from G_i1, the route fragment R_i1 differs from the corresponding fragment at the server side. The client may then request a fastest traffic aware route at timestamp T from a routing server between a START_SEGMENT, set equal to V_i0, and TARGET_SEGMENT, replacing the client-generated route with the response from the routing server. This technique replaces only route fragments that do not match between a server and a client rather than replacing an entire route. This minimizes the bandwidth used between the client and the server, avoiding unnecessary latency and network traffic.

FIG. 4 is a flowchart illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

FIG. 4 illustrates a flowchart depicting a method of generating a route and codifying the route as a series of fingerprints that are encoded identifiers of road segments of the route. As shown, an indication of a route request between an origin and one or more points-of-interest is shown at 410. The route request may be from, for example, a client looking for route guidance between a starting point, which may be the client's current location, and each of a plurality of points-of-interest. Embodiments described herein identify a starting road segment corresponding to the origin and a point-of-interest road segment corresponding to each of the points-of-interest at 420. The starting road segment is identified as the road segment along which the origin may be found, while the point-of-interest road segment is identified as the road segment along which a point-of-interest may be found. One or more intermediate points for each route between the starting road segment and a respective point-of-interest road segment may be received at 430. Based on the intermediate points, one or more intermediate segments for each route between the starting road segment and the respective point-of-interest road segment may be identified at 440. A route between the starting road segment and the point-of-interest road segment may be established at 450, the route including a plurality of road segments and the one or more intermediate segments. Each route may include a plurality of route fragments, where a fingerprint is generated at 460 for each route fragment. A server provided fingerprint may be received at 470 for each route fragment. The generated fingerprints may be compared against the server provided fingerprints at 480, and in response to the fingerprints matching, navigational assistance may be provided along at least one of the routes at 490.

In an example embodiment, an apparatus for performing the method of FIG. 11 above may comprise a processor (e.g., the processor 202) configured to perform some or each of the operations (410-490) described above. The processor may, for example, be configured to perform the operations (410-490) by performing hardware implemented logical functions and/or executing stored instructions for performing each of the operations. Alternatively, the apparatus may comprise means for performing each of the operations described above. In this regard, according to an example embodiment, examples of means for performing operations 410-490 may comprise, for example, the processor 202 and/or a device or circuit for executing instructions for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:

provide an indication of a route request between an origin and one or more points-of-interest;
identify a starting road segment corresponding to the origin;
identify a point-of-interest road segment corresponding to each of the one or more points-of-interest;
receive one or more intermediate points for a route between the starting road segment and each of the one or more point-of-interest road segments;
identify one or more intermediate segments corresponding to the one or more intermediate points;
generate at least one route between the starting road segment and a corresponding one of the one or more point-of-interest road segments and including the one or more intermediate segments, wherein the route comprises a plurality of route fragments, each route fragment extending between a starting road segment and an intermediate segment of the one or more intermediate segments, between intermediate segments of the one or more intermediate segments, or between an intermediate segment of the one or more intermediate segments and the respective point-of-interest road segment;
generate a fingerprint for each route fragment of the at least one route;
receive, in response to the route request, a server-provided fingerprint for each route fragment;
compare the generated fingerprints for each route fragment with the server-provided fingerprints for each route fragment; and
in response to the generated fingerprints for each route fragment corresponding with the server-provided fingerprints for each route fragment, providing navigational assistance for traveling along the route.

2. The apparatus of claim 1, wherein causing the apparatus to generate a fingerprint for each route fragment comprises causing the apparatus to, for each route fragment:

retrieve map agnostic properties of road segments of the respective route fragment, wherein the map agnostic properties include one or more of road name, road number, travel direction, or functional class;
combine the map agnostic properties into a string;
hash the string of agnostic properties using a hash function to obtain a hash value; and
identify a leading predetermined number of characters of the hash value as the fingerprint.

3. The apparatus of claim 2, wherein the apparatus is further caused to:

in response to a first fingerprint of the fingerprints for each route fragment corresponding to a first route fragment failing to correspond with a first fingerprint of the server-provided fingerprints, provide an indication of a revised route fragment request between a starting point of the first route fragment and an ending point of the first route fragment.

4. The apparatus of claim 3, wherein the revised route fragment request comprises a prohibition of using a road segment of the first route fragment in a revised route.

5. The apparatus of claim 1, wherein the apparatus is further caused to:

in response to a first fingerprint of the fingerprints for each route fragment failing to correspond with a first fingerprint of the server-provided fingerprints, provide a request for a map update.

6. The apparatus of claim 5, wherein the request for the map update comprises a request for a map update to a finite region of the map, wherein the finite region corresponds to a region including a road segment associated with the first fingerprint of the server-provided fingerprints.

7. The apparatus of claim 1, wherein causing the apparatus to generate at least one route comprises causing the apparatus to:

calculate a distance for each path that begins at the starting road segment and ends at a point-of-interest of the one or more points-of-interest; and
identify the path to each point-of-interest comprising the shortest distance as the route to the respective point-of-interest.

8. The apparatus of claim 1, wherein causing the apparatus to generate at least one route comprises causing the apparatus to:

calculate a cost factor for each path that begins at the starting road segment and ends at a point-of-interest of the one or more points-of-interest; and
identify the path to each point-of-interest comprising the lowest cost factor as the route to the respective point-of-interest.

9. A computer program product comprising at least one non-transitory computer-readable storage medium having computer-executable program code portions stored therein, the computer-executable program code portions comprising program code instructions configured to:

provide an indication of a route request between an origin and one or more points-of-interest;
identify a starting road segment corresponding to the origin;
identify a point-of-interest road segment corresponding to each of the one or more points-of-interest;
receive one or more intermediate points for a route between the starting road segment and each of the one or more point-of-interest road segments;
identify one or more intermediate segments corresponding to the one or more intermediate points;
generate at least one route between the starting road segment and a corresponding one of the one or more point-of-interest road segments and including the one or more intermediate segments, wherein the route comprises a plurality of route fragments, each route fragment extending between a starting road segment and an intermediate segment of the one or more intermediate segments, between intermediate segments of the one or more intermediate segments, or between an intermediate segment of the one or more intermediate segments and the respective point-of-interest road segment;
generate a fingerprint for each route fragment of the at least one route;
receive, in response to the route request, a server-provided fingerprint for each route fragment;
compare the generated fingerprints for each route fragment with the server-provided fingerprints for each route fragment; and
in response to the generated fingerprints for each route fragment corresponding with the server-provided fingerprints for each route fragment, provide navigational assistance for traveling along the route.

10. The computer program product of claim 9, wherein the program code instructions to generate a fingerprint for each route fragment comprise program code instructions to, for each route fragment:

retrieve map agnostic properties of road segments of the respective route fragment, wherein the map agnostic properties include one or more of road name, road number, travel direction, or functional class;

combine the map agnostic properties into a string;
hash the string of map agnostic properties using a hash function to obtain a hash value; and
identify a predetermined number of leading characters of the hash value as the fingerprint.

11. The computer program product of claim 10, further comprising program code instructions to:
in response to a first fingerprint of the fingerprints for each route fragment corresponding to a first route fragment failing to correspond with a first fingerprint of the server-provided fingerprints, provide an indication of a revised route fragment request between starting point of the first route fragment and an ending point of the first route fragment.

12. The computer program product of claim 11, wherein the revised route fragment request comprises a prohibition of using a road segment of the first route fragment in a revised route.

13. The computer program product of claim 9, further comprising program code instructions to:
in response to a first fingerprint of the fingerprints for each route fragment failing to correspond with a first fingerprint of the server-provided fingerprints, provide a request for a map update.

14. The computer program product of claim 13, wherein the request for the map update comprises a request for a map update to a finite region of the map, wherein the finite region corresponds to a region including a road segment associated with the first fingerprint of the server-provided fingerprints.

15. The computer program product of claim 9, wherein the program code instructions to generate at least one route comprise program code instructions to:
calculate a distance for each path that begins at the starting road segment and ends at a point-of-interest of the one or more points-of-interest; and
identify the path to each point-of-interest comprising the shortest distance as the route to the respective point-of-interest.

16. The computer program product of claim 9, wherein the program code instructions to generate at least one route comprise program code instructions to:
calculate a cost factor for each path that begins at the starting road segment and ends at a point-of-interest of the one or more points-of-interest; and
identify the path to each point-of-interest comprising the lowest cost factor as the route to the respective point-of-interest.

17. A method comprising:
providing an indication of a route request between an origin and one or more points-of-interest;
identifying a starting road segment corresponding to the origin;
identifying a point-of-interest road segment corresponding to each of the one or more points-of-interest;
receiving one or more intermediate points for a route between the starting road segment and each of the one or more point-of-interest road segments;
identifying one or more intermediate segments corresponding to the one or more intermediate points;
generating at least one route between the starting road segment and a corresponding one of the one or more point-of-interest road segments and including the one or more intermediate segments, wherein the route comprises a plurality of route fragments, each route fragment extending between a starting road segment and an intermediate segment of the one or more intermediate segments, between intermediate segments of the one or more intermediate segments, or between an intermediate segment of the one or more intermediate segments and the respective point-of-interest road segment;
generating a fingerprint for each route fragment of the at least one route;
receiving, in response to the route request, a server-provided fingerprint for each route fragment;
comparing the generated fingerprints for each route fragment with the server-provided fingerprints for each route fragment; and
in response to the generated fingerprints for each route fragment corresponding with the server-provided fingerprints for each route fragment, providing navigational assistance for traveling along the route.

18. The method of claim 17, wherein generating a fingerprint for each route fragment comprises, for each route fragment:
retrieving map agnostic properties of road segments of the respective route fragment, wherein the map agnostic properties include one or more of road name, road number, travel direction, or functional class;
combining the map agnostic properties into a string;
hashing the string of map agnostic properties using a hash function to obtain a hash value; and
identifying a predetermined number of leading characters of the hash value as the fingerprint.

19. The method of claim 18, further comprising:
in response to a first fingerprint of the fingerprints for each route fragment corresponding to a first route fragment failing to correspond with a first fingerprint of the server-provided fingerprints, providing an indication of a revised route fragment request between a starting point of the first route fragment and an ending point of the first route fragment.

20. The method of claim 19, wherein the revised route fragment request comprises a prohibition of using a road segment of the first route fragment in a revised route.

21. The method of claim 17, further comprising:
in response to a first fingerprint of the fingerprints for each route fragment failing to correspond with a first fingerprint of the server-provided fingerprints, providing a request for a map update.

22. The method of claim 21, wherein the request for the map update comprises a request for a map update to a finite region of the map, wherein the finite region corresponds to a region including a road segment associated with the first fingerprint of the server-provided fingerprints.

23. The method of claim 17, wherein generating at least one route comprises:
calculating a distance for each path that begins at the starting road segment and ends at a point-of-interest of the one or more points-of-interest; and
identifying the path to each point-of-interest comprising the shortest distance as the route to the respective point-of-interest.

24. The apparatus of claim 17, wherein generating at least one route comprises:
calculating a cost factor for each path that begins at the starting road segment and ends at a point-of-interest of the one or more points-of-interest; and
identifying the path to each point-of-interest comprising the lowest cost factor as the route to the respective point-of-interest.

* * * * *